March 31, 1925.  1,531,866
F. W. MARTIN
CONTROLLING MECHANISM FOR LOCOMOTIVE BOOSTER MOTORS
Filed Nov. 28, 1922  2 Sheets-Sheet 1
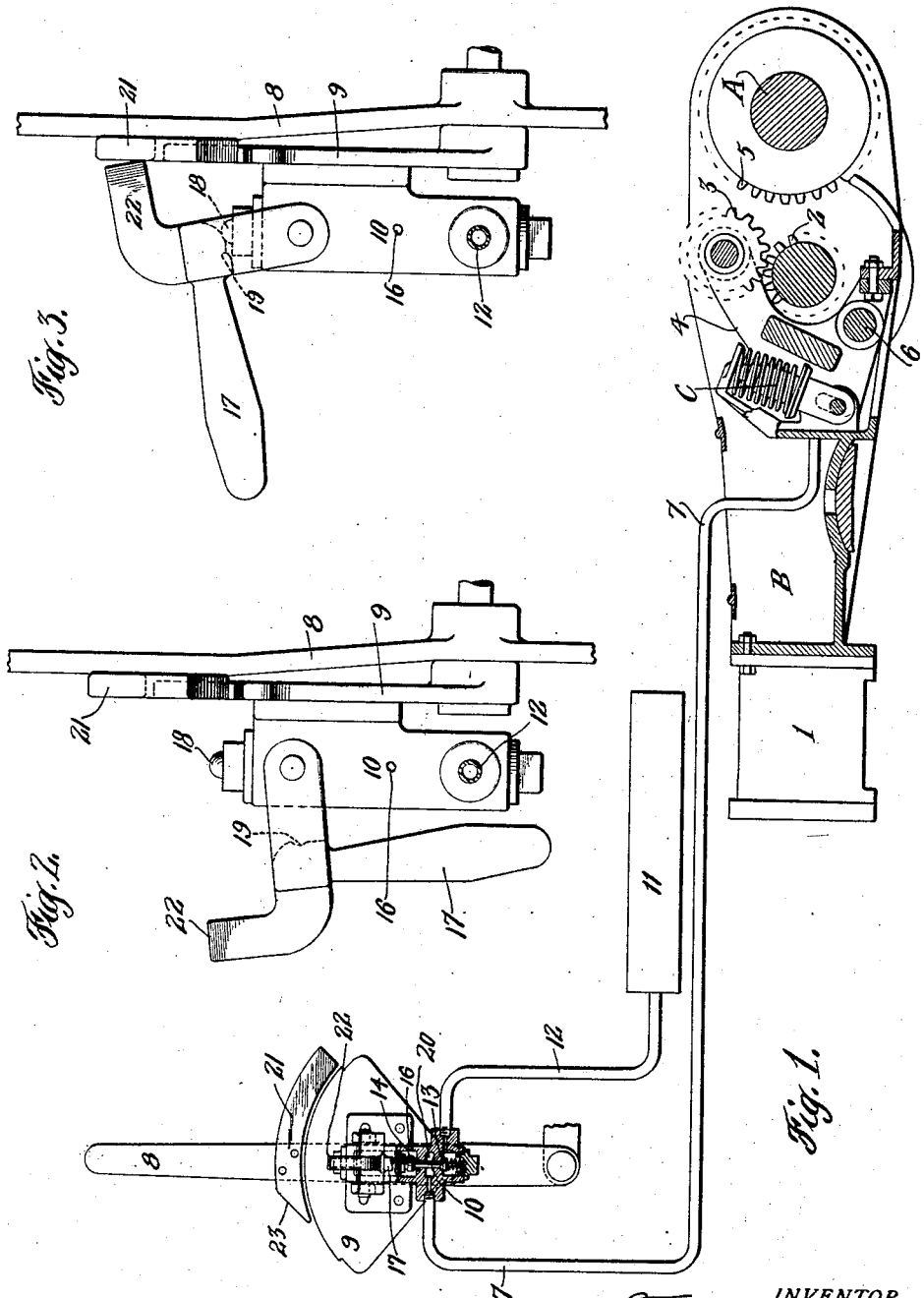
WITNESS.
Gustav Genzlinger.
INVENTOR
Frederick W. Martin
BY
Synnestvedt Lechner
ATTORNEYS March 31, 1925.  F. W. MARTIN  1,531,866
CONTROLLING MECHANISM FOR LOCOMOTIVE BOOSTER MOTORS
Filed Nov. 28, 1922  2 Sheets-Sheet 2
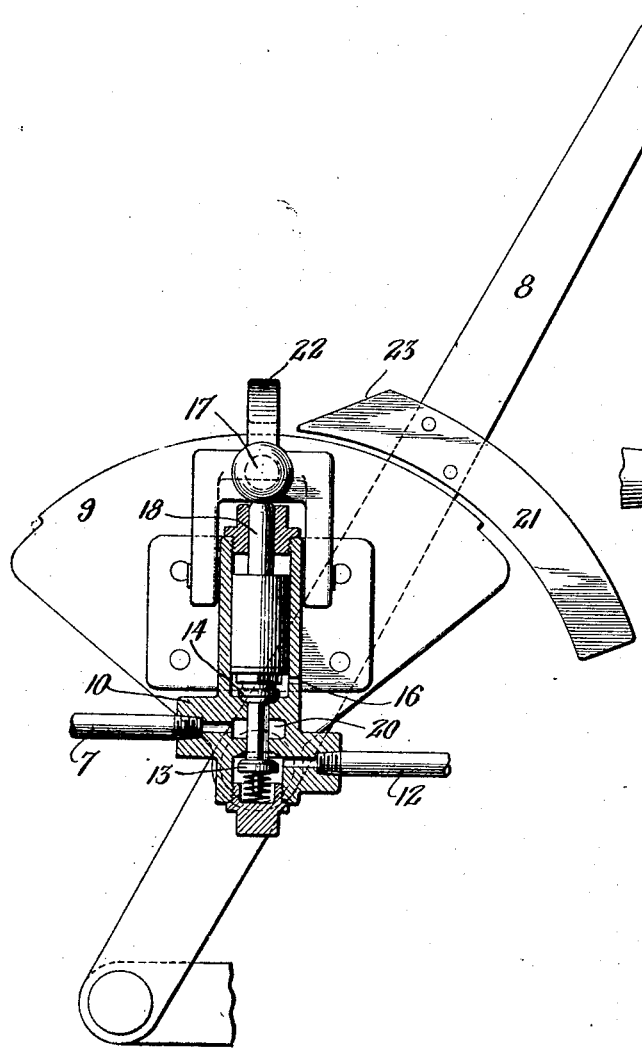
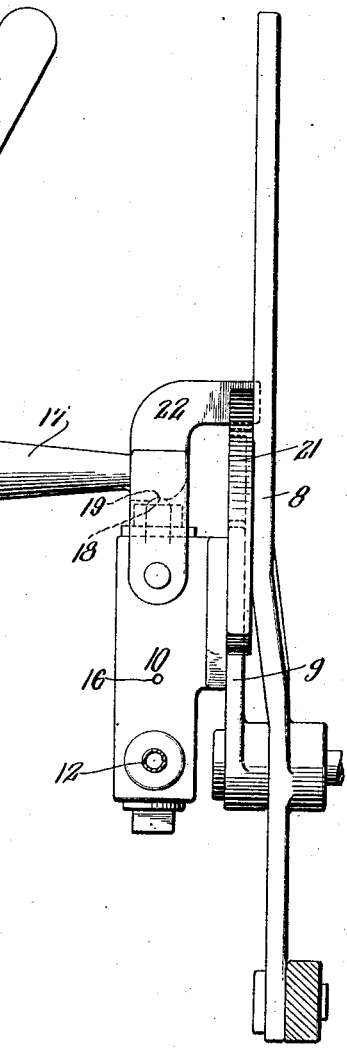
WITNESS
Gustav Genzlinger.
INVENTOR
Frederick W. Martin
BY
ATTORNEYS Patented Mar. 31, 1925.

1,531,866

UNITED STATES PATENT OFFICE.

FREDERICK W. MARTIN, OF BROOKLYN, NEW YORK, ASSIGNOR TO FRANKLIN RAILWAY SUPPLY COMPANY, A CORPORATION OF DELAWARE.

CONTROLLING MECHANISM FOR LOCOMOTIVE BOOSTER MOTORS.

Application filed November 28, 1922. Serial No. 603,802.

*To all whom it may concern:*

Be it known that I, FREDERICK W. MARTIN, a citizen of the United States, residing at Brooklyn, in the county of Kings and State of New York, have invented certain new and useful Improvements in Controlling Mechanism for Locomotive Booster Motors, of which the following is a specification.

This invention relates to locomotive booster motors of the type which are illustrated, for instance, in patent to Ingersoll No. 1,339,395 as well as in a patent to Sheehan No. 1,413,688, and it has to do particularly with an improved controlling system for such booster motors.

Booster motors of the character specified are intended to aid the main driving means of the locomotive at low speeds thereof and especially in starting or on long slow pulls up grade. They are arranged to drive a normally idle axle either on the locomotive or on the tender the wheels of which are generally of considerably smaller diameter than the main driving wheels of the locomotive.

The booster is a small steam engine the reciprocating parts of which could not safely attain a speed which would be equivalent to the higher speeds of the locomotive. It has therefore been the practice to cut out these booster motors just as soon as the locomotive attains a certain predetermined speed which of course might vary between reasonable limits although a good average is probably 15 to 18 or possibly 20 miles per hour. The application of this invention however is not limited to any particular speed as will further appear.

With the foregoing in mind the objects of my invention will be better understood. I provide an improved controlling mechanism or system for booster motors which when functioning is under the control of the controlling devices for the locomotive itself. Stated in other words I associate my improved booster controlling mechanism with the controlling mechanism for the locomotive in such way that it can be applied to the locomotive without in any way altering or impairing the controlling devices of the locomotive. More specifically stated I provide a primary control or pilot valve for the booster motor controlling system which cannot be opened except under certain predetermined conditions of the controlling devices for the locomotive itself. I provide an operating lever or latch for actuating this primary control or pilot valve which can be thrown into operative position only under certain predetermined conditions of the controlling devices for the locomotive. But the objects and advantages of my invention can best be understood by referring in detail to the accompanying drawings which illustrate it in its preferred form and wherein:

Fig. 1 is a diagrammatic layout of a booster motor with my improved controlling means therefor; Fig. 2 is an enlarged side elevation of the principal parts of my improvements with the booster latch in inoperative position; Fig. 3 is a view similar to the one shown in Fig. 2 but illustrating the booster latch as it approaches operative position but before it can finally attain such position; Fig. 4 is a similar view on still a larger scale illustrating the booster latch in its operative position; and Fig. 5 is a face view of my improvements with certain parts in section, the booster latch being shown in its operative position.

The booster motor B is diagrammatically illustrated in association with the axle A which it is intended to drive, said axle being any desired one either on the locomotive proper or on the tender. I have not illustrated every part of a booster device of the type herein exemplified nor an entire controlling system therefor inasmuch as it is unnecessary to do so in order to fully disclose the present invention and, if included, would simply multiply the figures in the drawings and augment the description to a needless extent. Suffice it to say, in preface to the following detailed description of the parts which are illustrated, that the entire booster system can be made a "live" system, so to speak, one, the parts of which are or will be functioning at their proper times, by admitting pressure to the pipe 7. On the other hand when pressure is exhausted from pipe 7 the booster system becomes "dead" and ceases to be either an actual or a potential driving factor.

There are normally two booster cylinders 1 which, as is now well understood in this art, are adapted to drive the pinion 2. When the booster is not entrained or in other words not in operation it is desirable that it be disconnected from the axle A. The idler gear 3 therefore, although it is constantly in mesh with the pinion 2, is mounted upon a pivoted rocking arm 4 by means of which it can be thrown into mesh with the driving gear 5 on the axle A. A small power means in the shape of a piston and cylinder device indicated as a whole by the reference character C is provided for moving the arm 4 to throw idler gear 3 into mesh with gear 5, the arm 4 being pivoted upon the pin or rod 6. The details of the device C are not illustrated herein as they form no part of the present invention and have been well illustrated and claimed by other inventors prior to this time. When fluid pressure is admitted to the device C through the pipe 7, arm 4 is rocked to the right in order to mesh gears 3 and 5. The booster is then entrained and ready to become a driving factor in the propulsion of the locomotive.

My invention relates more particularly to the means employed for controlling the moment at which the booster motor will be conditioned to aid in driving the main locomotive. I prefer to associate my improved controlling mechanism with the reverse lever 8 and quadrant 9 of the controlling devices for the locomotive although it might be possible to associate it with some other moving part of such controlling devices as for instance some moving part of a power reverse mechanism.

The primary control valve or rather the housing or casing 10 of this valve is secured to the quadrant 9. Pressure for operating the booster motor equipment can be supplied from any suitable source such for instance as the reservoir 11. Pressure from the reservoir is conducted to the valve casing 10 through the pipe 12.

As illustrated in Fig. 1, valve 13 is normally closed so that no pressure can pass from the pipe 12 to the pipe 7 and thence to the booster motor apparatus. Valve 14 is open at such times so that exhaust may take place through the port 16. When the valves are in this position the booster latch 19 is not in its operative position although it might be in the position indicated in either Figure 2 or Figure 3.

When the latch 19 is raised by means of the handle 17, it will be noted that under certain conditions it can depress the plunger 18 in the primary control valve 10. This is clearly illustrated in Figs. 4 and 5 and when so depressed valve 14 is closed (see Fig. 5) and valve 13 is opened so that the exhaust through port 16 is shut off and communication established between pipes 12 and 7 through the medium of chamber 20.

It will be seen however that I provide a guard 21 on the reverse lever 8 against which the projecting nose 22 at the upper part of the booster latch is adapted to abut in certain predetermined positions of the reverse lever. As previously explained it is desired to have the booster motor function as a driving power only at slow speeds or comparatively slow speeds of the locomotive. When the reverse lever is moved over into the corner as illustrated in Figs. 4 and 5 the guard 21 will not be in the path of the nose 22 so that the latch 19 can be thrown into operative position. For a certain distance back from the corner it is also possible to hold the latch 19 in its operative position but beyond a predetermined point the inclined face 23 of the guard will ride under the nose 22 of the latch and throw the latch outward and downward so as to release the plunger 18, close valve 13 and open valve 14. A brief summary of the entire operation is as follows: In starting up a locomotive the engineer throws the reverse lever into the corner as it is colloquially expressed which position is illustrated in Figs. 4 and 5. If it is desired to use the booster, handle 17 is lifted upwardly so that the latch 19 engages and pushes down the plunger 18. Pressure is thereupon admitted to the booster mechanism and it can become a driving power. As the speed of the locomotive increases the engineman begins to pull back on the reverse lever and when the inclined surface 23 comes into engagement with the nose 22 the latch 19 will be thrown outwardly and downwardly into its inoperative position illustrated to best advantage in Fig. 2. When the latch has been thrown out the booster mechanism will automatically cease to function.

I claim:

1. In a controlling system for locomotive booster motors the combination with the locomotive reverse mechanism, of a pilot control means for the system, a movable member for actuating said pilot control means, and a guard associated with the reverse mechanism adapted to prevent actuation of said pilot control means by said movable member except in a predetermined position of the reverse mechanism.

2. In a controlling system for locomotive booster motors the combination with the locomotive reverse lever and quadrant, of a booster pilot valve, a latch for opening said valve and a guard associated with the reverse lever adapted to prevent opening of the valve by said latch except in a predetermined position of the reverse lever.

3. In a controlling system for locomotive booster motors the combination with the locomotive reverse lever and quadrant of a booster pilot valve carried by the quadrant, a latch for opening said valve, and a guard on the reverse lever adapted to prevent opening of the valve by said latch except in a predetermined position of the reverse lever.

4. In a controlling system for locomotive booster motors the combination with the locomotive reverse mechanism, of a pilot control means for the system and a member for actuating it, said reverse mechanism being adapted to block the actuating member except under certain predetermined positions of the reverse mechanism.

5. In a controlling system for locomotive booster motors the combination with the locomotive reverse mechanism, of a pilot control means for the system, a movable member for actuating said pilot control means, a guard associated with the reverse mechanism adapted to prevent actuation of said pilot control means by said movable member except in a predetermined position of the reverse mechanism, and means on the guard for throwing the movable member out of actuating position.

6. In a controlling system for locomotive booster motors the combination with the locomotive reverse lever and quadrant, of a booster pilot valve, a latch for opening said valve and a guard associated with the reverse lever adapted to prevent opening of the valve by said latch except in a predetermined position of the reverse lever said guard being adapted to throw the latch out of its operative position upon return movement of the reverse lever past a predetermined point.

7. In a controlling system for locomotive booster motors the combination with the locomotive reverse lever and quadrant of a booster pilot valve carried by the quadrant, a manually movable pivoted latch for opening said valve said latch being normally in inoperative position, a guard on the reverse lever for preventing movement of the latch to open the valve except in positions of the reverse lever where the locomotive is being operated at comparatively slow speeds, and an inclined face on the guard for throwing out the latch when the reverse lever is retracted past a predetermined point.

In testimony whereof I have hereunto signed my name.

FREDERICK W. MARTIN.